(12) United States Patent
Hamers

(10) Patent No.: US 11,285,774 B2
(45) Date of Patent: Mar. 29, 2022

(54) HYDRAULIC VIBRATION DAMPER, IN PARTICULAR FOR A VEHICLE CHASSIS

(71) Applicants: THYSSENKRUPP BILSTEIN GMBH, Ennepetal (DE); thyssenkrupp AG, Essen (DE)

(72) Inventor: Wolfgang Hamers, Jülich (DE)

(73) Assignees: THYSSENKRUPP BILSTEIN GMBH, Ennepetal (DE); THYSSENKRUPP AG, Essen (DE)

( * ) Notice: Subject to any disclaimer, the term of this patent is extended or adjusted under 35 U.S.C. 154(b) by 308 days.

(21) Appl. No.: 16/496,843

(22) PCT Filed: Mar. 26, 2018

(86) PCT No.: PCT/EP2018/057586
§ 371 (c)(1),
(2) Date: Sep. 23, 2019

(87) PCT Pub. No.: WO2018/177976
PCT Pub. Date: Oct. 4, 2018

(65) Prior Publication Data
US 2020/0031190 A1 Jan. 30, 2020

(30) Foreign Application Priority Data
Mar. 29, 2017 (DE) .................... 10 2017 106 802.3

(51) Int. Cl.
*F16F 9/44* (2006.01)
*B60G 17/08* (2006.01)
(Continued)

(52) U.S. Cl.
CPC ............. *B60G 17/08* (2013.01); *B60G 13/08* (2013.01); *F16F 9/19* (2013.01); *F16F 9/348* (2013.01);
(Continued)

(58) Field of Classification Search
CPC .... F16F 9/19; F16F 9/348; F16F 9/465; F16F 9/50; F16F 2222/12; F16F 2228/066;
(Continued)

(56) References Cited

U.S. PATENT DOCUMENTS 5,085,299 A 2/1992 Spiess
5,611,413 A 3/1997 Feigel
(Continued)

FOREIGN PATENT DOCUMENTS

CN 1325799 A 12/2001
CN 105313627 A 2/2016
(Continued)

OTHER PUBLICATIONS

English Translation of International Search Report issued in PCT/EP2018/057586, dated Jul. 2, 2018.

*Primary Examiner* — Thomas W Irvin
(74) *Attorney, Agent, or Firm* — thyssenkrupp North America, LLC

(57) ABSTRACT

A hydraulic vibration damper, in particular for a vehicle chassis, includes a cylinder tube for receiving a hydraulic fluid. A piston is axially movable within the cylinder tube along a cylinder tube axis and subdivides the cylinder tube into two working chambers. A piston rod is oriented parallel to the cylinder tube axis and is connected to the piston. At least one valve assembly for damping the piston movement in a direction of actuation is arranged at a fluid leadthrough. A bypass duct includes a sub-duct provided in addition to the fluid leadthrough between the two working chambers. A valve arrangement with continuously adjustable damping force is provided which regulates the throughflow through the fluid leadthrough and the sub-duct. The sub-duct includes a throttling mechanism, having a throttle, and a (Continued)

non-return valve. The throttle and the non-return valve of the sub-duct are arranged in series.

15 Claims, 2 Drawing Sheets

(51) Int. Cl.
*B60G 13/08* (2006.01)
*F16F 9/19* (2006.01)
*F16F 9/348* (2006.01)
*F16F 9/46* (2006.01)
*F16F 9/50* (2006.01)

(52) U.S. Cl.
CPC ................ *F16F 9/465* (2013.01); *F16F 9/50* (2013.01); *B60G 2202/24* (2013.01); *B60G 2204/62* (2013.01); *B60G 2206/41* (2013.01); *B60G 2500/104* (2013.01); *B60G 2500/114* (2013.01); *B60G 2800/162* (2013.01); *F16F 2222/12* (2013.01); *F16F 2228/066* (2013.01); *F16F 2234/02* (2013.01)

(58) Field of Classification Search
CPC ..... F16F 2234/02; B60G 17/08; B60G 13/08; B60G 2202/24; B60G 2204/62; B60G 2206/41; B60G 2500/104; B60G 2500/114; B60G 2800/162
See application file for complete search history.

(56) References Cited

U.S. PATENT DOCUMENTS

| | | | | |
|---|---|---|---|---|
| 5,788,030 A * | 8/1998 | Rottenberger | ............ | F16F 9/34 188/290 |
| 5,996,748 A | 12/1999 | Nezu | | |
| 6,279,854 B1 * | 8/2001 | Lindahl | .................... | B64C 25/22 244/1 OOR |
| 6,296,091 B1 * | 10/2001 | Hamilton | ........... | B60G 17/0152 188/314 |
| 7,699,147 B2 * | 4/2010 | Preukschat | ............. | F16F 9/512 188/282.4 |
| 8,307,965 B2 * | 11/2012 | Foster | ..................... | F16F 9/516 188/318 |
| 9,879,744 B2 * | 1/2018 | Haller | .................. | B60G 99/002 |
| 10,086,673 B2 * | 10/2018 | Baales | ................... | B60G 21/06 |
| 10,465,764 B2 * | 11/2019 | Smeljanskij | ........... | B60G 17/08 |
| 10,508,705 B2 * | 12/2019 | Funke | ..................... | F16F 9/065 |
| 10,526,014 B2 * | 1/2020 | Hamers | ................. | F16F 9/3482 |
| 10,557,512 B2 * | 2/2020 | Forster | .................... | F16F 9/325 |
| 11,084,350 B2 * | 8/2021 | Birch | ................... | B60G 17/015 |
| 2009/0194921 A1 * | 8/2009 | Smith | ....................... | F16F 9/20 267/141.1 |
| 2009/0236193 A1 | 9/2009 | Schmidt | | |
| 2011/0042174 A1 | 2/2011 | Hamers | | |
| 2014/0216871 A1 * | 8/2014 | Shibahara | ................. | F16F 9/46 188/313 |
| 2014/0224606 A1 | 8/2014 | Baales | | |
| 2015/0276003 A1 | 10/2015 | Ohta | | |
| 2016/0230830 A1 * | 8/2016 | Haller | ..................... | F16F 9/185 |
| 2017/0219041 A1 | 8/2017 | Debruler | | |
| 2017/0313355 A1 | 11/2017 | Hamers | | |
| 2018/0038441 A1 | 2/2018 | Smeljanskij | | |
| 2018/0058532 A1 * | 3/2018 | Forster | ................. | F16F 9/5126 |

FOREIGN PATENT DOCUMENTS

| | | |
|---|---|---|
| DE | 3917064 A | 11/1990 |
| DE | 4129581 C | 10/2000 |
| DE | 102008015415 B | 10/2009 |
| DE | 102008015412 B | 8/2013 |
| DE | 102014201516 A | 8/2014 |
| DE | 102014215571 A | 2/2016 |
| DE | 102014116264 A | 5/2016 |
| DE | 102015102478 A | 8/2016 |
| WO | 2016192847 A | 12/2016 |

\* cited by examiner

HYDRAULIC VIBRATION DAMPER, IN PARTICULAR FOR A VEHICLE CHASSIS

CROSS REFERENCE TO RELATED APPLICATIONS

This application is a U.S. National Stage Entry of International Patent Application Serial Number PCT/EP2018/057586, filed Mar. 26, 2018, which claims priority to German Patent Application No. DE 10 2017 106 802.3, filed Mar. 29, 2017, the entire contents of both of which are incorporated herein by reference.

FIELD

The present disclosure generally relates to a vibration damper with a bypass duct, as is used for example in vehicles.

BACKGROUND

A vibration damper is known from German Patent Application No. DE 10 2008 015 412 B4. In the case of this disclosed vibration damper, a bypass duct system consisting of two sub-ducts is used. For the rebound and compression stages of the piston, use is made in each case of an electromagnetic control valve, by way of which the flow cross section is set for the respective throughflow direction. It is possible by way of the control valves for the damping force of the vibration damper to be set separately for the rebound and compression stages. With said vibration damper, it is furthermore the case that, during the compression and rebound stages of the piston, in each case only one of the sub-ducts is flowed through. The closure of the in each case other sub-duct is realized by way of non-return valves, of which in each case at least one is fitted for both throughflow directions. Said non-return valves prevent the throughflow through the respective sub-duct for in each one movement direction of the piston. The bypass duct system is in this case formed in a housing which is fitted to the main tube of the vibration damper as a rucksack valve, wherein bores in the main tube make it possible for the bypass duct system to be flowed through. A disadvantage with said known vibration damper is that the non-return valves which are fitted for closing the sub-ducts of the bypass duct are each flowed through by the entire volume flow for one movement direction of the piston, and close off their respective sub-duct for the other movement direction of the piston. Consequently, wide opening of the non-return disk and accompanying intense compression of the restoring spring occur in each case in one movement direction of the piston with the flow through the non-return valves. With the reversal of the movement direction of the piston, intense pressure surges thus occur during the closure of the non-return valves. This behavior has an adverse effect on comfort during the use of the vibration damper, for example due to a high level of noise generation with the kickback of the valve disks, and is also a disadvantage for the service life and the wear of the non-return valves.

Other embodiments of vibration dampers and valve arrangements of vibration dampers according to the prior art are disclosed in DE 10 2015 102 478 A1, DE 10 2014 116 264 A1 and DE 10 2008 015 415 B4.

Thus a need exists to improve the behavior of hydraulic vibration dampers in comparison with the prior art such that the use of vibration dampers is more convenient and the wear is reduced and the service life of the components is thereby increased.

DETAILED DESCRIPTION

Figure 1:
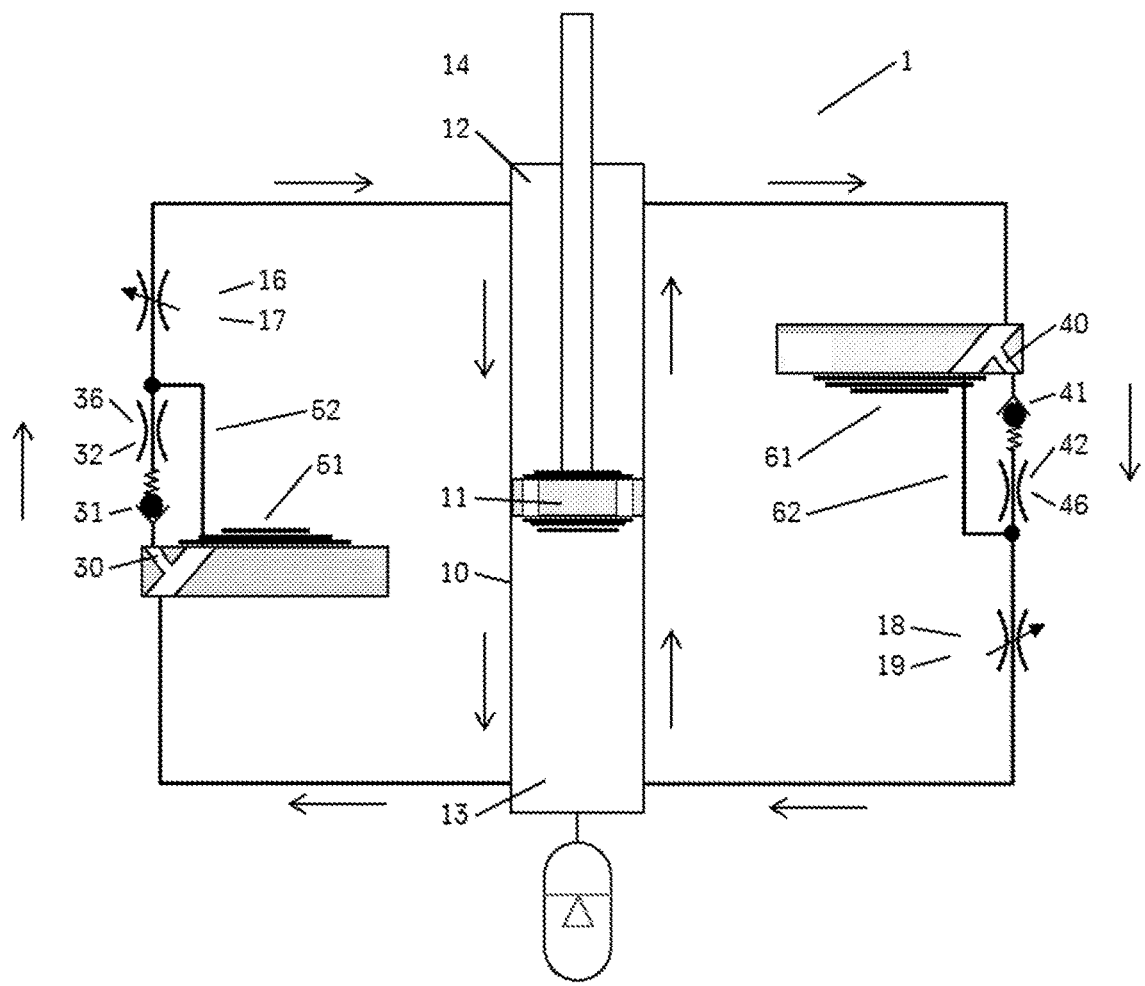
FIG. 1 is a block diagram according to an exemplary embodiment. The upwardly pointing arrows indicate the throughflow direction for the compression stage of the piston, and the downwardly pointing arrows indicate the throughflow direction for the rebound stage of the piston.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting "a" element or "an" element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

The present invention is based on a vibration damper with a bypass duct, as is used for example in vehicles.

In some examples, a hydraulic vibration damper, in particular for a vehicle chassis, may include a cylinder tube for receiving a hydraulic fluid, a piston which is axially movable within the cylinder tube along a cylinder tube axis and subdivides the cylinder tube into two working chambers, a piston rod which is oriented parallel to the cylinder tube axis and is connected to the piston, wherein at least one valve assembly for damping the piston movement in a direction of actuation is arranged at a fluid leadthrough, wherein a bypass duct which comprises at least one sub-duct is provided in addition to the fluid leadthrough between the two working chambers, wherein at least one valve arrangement with continuously adjustable damping force is provided which at least one valve arrangement regulates the throughflow through the fluid leadthrough and the sub-duct, characterized in that the sub-duct comprises at least one throttling mechanism, having at least one throttle, and at least one non-return valve, wherein the throttle and the non-return valve of the sub-duct are arranged in series with respect to one another.

In comparison with the prior art, the vibration damper according to the invention has the advantage that the non-return valve of the sub-duct and a throttle which is arranged in the sub-duct are connected in series. In this way, the volume flow through the non-return valve in the direction of passage is small in comparison with the disclosure of the prior art. On the one hand, this reduces the requirements for the technical configuration of the non-return valve and thereby facilitates the integration thereof into the vibration damper. On the other hand, the opening width of a non-return element (for example a non-return disk, a non-return ball, a non-return cone, etc.) of the non-return valve, and thus for example the force on a restoring spring, which occurs in the throughflow direction of the non-return valve, is in principle thereby reduced. In this way, for example the stroke of the non-return disk (or of the non-return element) of the non-return valve is also reduced, this being advantageous for the service life of the component and at the same time reducing the level of the noise generation during the closure of the non-return valve. Comfort is thus increased in comparison with the prior art.

According to a preferred embodiment of the present invention, it is provided that the blocking direction of the non-return valve points to the side facing away from the throttle.

According to a preferred embodiment of the present invention, it is provided that the non-return valve blocks the volume flow through the at least one sub-duct of the bypass duct for one of the two possible movement directions of the piston.

In said preferred embodiment variants of the invention, the volume flow through the sub-duct of the bypass duct at which the non-return valve is arranged is allowed by the non-return valve in the throughflow direction and, for a flow through the non-return valve in its blocking position, is prevented.

According to a further preferred embodiment variant of the present invention, it is provided that the non-return valve is formed in that, in its open position, it is flowed through only by the volume flow which flows through the sub-duct at which it is arranged.

In said embodiment variant, the throughflow through the non-return valve of the sub-duct is limited in the throughflow direction of the blocking valve by the at least one throttle which is arranged in the same sub-duct. In this way, in comparison with the prior art, a small flow through the non-return valve can be ensured, which reduces the kickback of the non-return valve during the reversal of the movement direction of the piston, this being advantageous for the service life of the component and at the same time reducing the noise generation during the closure of the non-return valve. The comfort behavior is thus improved in comparison with the prior art.

According to a further embodiment variant of the present invention, it is provided that the non-return valve of the sub-duct comprises a non-return disk, wherein said non-return disk has an initial pressure lower than 150000 Pa, and preferably an initial pressure lower than 100000 Pa.

In this way, according to an embodiment of the present invention, use is made of a non-return valve with a non-return disk, wherein said non-return disk has a low initial pressure of under 150000 Pa, and preferably of under 100000 Pa. This low initial pressure on the non-return disk of the non-return valve is suitable for controlling the small volume flow of the sub-duct of the bypass duct at which the non-return valve is arranged and advantageously for the noise generation during operation.

According to a preferred embodiment of the present invention, it is provided that the valve arrangement with continuously adjustable damping force comprises at least one electromagnetically actuable, continuously adjustable control valve.

This makes it possible, according to the invention, for the damping of the vibration damper to be able to be set continuously and thus to be able to adapted to a wide variety of requirements in a highly flexible manner. This damping mechanism is in particular advantageous with respect to methods which allow only a limited number of different damping stages.

According to a preferred embodiment of the present invention, it is provided that the vibration damper comprises a further valve assembly for damping the piston movement in a second direction of actuation, which further valve assembly is arranged at a further fluid leadthrough.

According to a preferred embodiment of the present invention, it is provided that the bypass duct comprises a further sub-duct, wherein at least one further valve arrangement with continuously adjustable damping force is provided which at least one valve arrangement regulates the throughflow through the further fluid leadthrough and the further sub-duct.

According to a further preferred embodiment of the present invention, the further sub-duct comprises at least one further non-return valve and one further throttling mechanism, which comprises at least one further throttle, wherein the further throttle and the further non-return valve are arranged in series with respect to one another, wherein the further non-return valve is formed in that, in its open position, it is flowed through only by the volume flow which flows through the further sub-duct at which it is arranged.

Through this preferred embodiment of the invention, in each case one sub-duct of the bypass can be flowed through during the compression stage of the piston and one sub-duct can be flowed through during the rebound stage of the piston. The in each case other sub-duct is closed off by the respective non-return valve which is arranged in this sub-duct. In this way, for the rebound and compression stages of the piston, a different damping can be realized in each case.

Furthermore, according to a preferred embodiment of the present invention, it is provided that the sub-duct is able to be passed through only during the compression stage, and the further sub-duct is able to be passed through only during the rebound stage, of the piston.

Through this preferred embodiment of the invention, in each case one sub-duct of the bypass can be flowed through during the compression stage of the piston and one sub-duct can be flowed through during the rebound stage of the piston. In this way, for the rebound and compression stages of the piston, a different damping can be realized in each case.

According to a preferred embodiment of the present invention, it is provided that the further valve arrangement with continuously adjustable damping force comprises at least one electromagnetically actuable, continuously adjustable control valve.

This makes it possible, according to the invention, for the damping of the vibration damper to be able to be set continuously for the second movement direction too and thus to be able to adapted to a wide variety of requirements in a highly flexible manner. This damping mechanism is in particular advantageous with respect to methods which allow only a limited number of different damping stages.

According to a further preferred embodiment of the present invention, it is provided that the sub-duct of the bypass duct and the further sub-duct of the bypass duct comprise identical non-return valves and identical throttling mechanisms.

This preferred embodiment of the invention allows the production costs to be reduced since, for the two sub-ducts, use is made of identical components for both valve arrangements.

According to a further preferred embodiment of the present invention, it is provided that the bypass duct, including the components of the two sub-ducts, is arranged in a common housing with a first and a second hydraulic chamber, wherein the first hydraulic chamber connects the bypass duct to the first working chamber of the cylinder tube via a first bore, and the second hydraulic chamber connects the bypass duct to the second working chamber of the cylinder tube via a second bore.

This preferred embodiment of the invention makes it possible for the bypass duct and the sub-ducts belonging thereto, including the non-return valves and throttling mechanisms which the sub-ducts comprise, to be designed in the form of rucksack valves. This especially has the practical advantage that the rucksack valves can be fitted in an uncomplicated manner to different cylinder tubes and pistons. This increases usability and lowers the production costs.

According to a further preferred embodiment of the present invention, it is provided that the housing is of cylindrical form.

This preferred type of embodiment allows the use of components with a circular base surface, that is to say the compatibility with a large number of valves, etc.

According to a further preferred embodiment of the invention, it is provided that the sub-duct of the bypass duct or the components of the sub-duct of the bypass duct, in particular the throttle (the throttling mechanism) and the non-return valve, is/are arranged in a separate housing.

According to a further preferred embodiment of the invention, it is provided that the throttle (the throttling mechanism), the non-return valve and the valve arrangement with continuously adjustable damping force are arranged in a separate housing.

According to a further preferred embodiment of the invention, it is provided that the throttle (the throttling mechanism), the non-return valve, the valve arrangement with continuously adjustable damping force, the fluid leadthrough and the valve assembly are arranged in a separate housing.

According to a further preferred embodiment of the invention, it is provided that the further sub-duct of the bypass duct or the components of the further sub-duct of the bypass duct, in particular the further throttle (the further throttling mechanism) and the further non-return valve, is/are arranged in a further separate housing.

According to a further preferred embodiment of the invention, it is provided that the further throttle (the further throttling mechanism), the further non-return valve and the further valve arrangement with continuously adjustable damping force are arranged in a further separate housing.

According to a further preferred embodiment of the invention, it is provided that the further throttle (the further throttling mechanism), the further non-return valve and the further valve arrangement with continuously adjustable damping force, the further fluid leadthrough and the further valve assembly are arranged in a further separate housing.

FIG. 1 illustrates a block diagram of the hydraulic flow in a vibration damper 1 according to an exemplary embodiment of the invention. The upwardly pointing arrows indicate the throughflow direction for the compression stage of the piston 11, and the downwardly pointing arrows indicate the throughflow direction for the rebound stage of the piston 11. The piston 11 comprises a piston rod 14 and subdivides the cylinder tube 10 into a first working chamber 12 and a second working chamber 13. The two sub-ducts 30, 40 of the bypass duct 20 are illustrated. Here, the sub-duct 30 comprises a series connection of a non-return valve 31 and a throttle 32, connected in series with said non-return valve 31, as part of a throttling mechanism 36. In this case, the blocking direction of the non-return valve 31 points to the side facing away from the throttle 32. The sub-duct 30 is thus able to be passed through for the compression stage of the piston. During the compression stage, the non-return valve 31 is in this case however flowed through not by the volume flow which flows through the valve assembly 51 of the fluid leadthrough 52 but exclusively by the volume flow which flows through the throttle 32 and which is throttled by said throttle 32. This is achieved in that the non-return valve 31 of the sub-duct 30 and the fluid leadthrough 52 with the valve assembly 51 are connected in parallel with one another. During the rebound stage of the piston, the non-return valve 31 blocks the throughflow through the sub-duct 30. Furthermore, the throughflow guide of the compression stage comprises a valve arrangement with continuously adjustable damping force 16, which comprises a continuously adjustable control valve 17, wherein the continuously adjustable control valve 17 is connected in series with the sub-duct 30 and the fluid leadthrough 52. It is possible by way of said continuously adjustable control valve 17 to continuously adjust the damping of the vibration damper for the compression stage of the piston. Here, the further sub-duct 40 comprises a series connection of a further non-return valve 41 and a further throttle 42, connected in series with said further non-return valve 41, as part of a further throttling mechanism 46. In this case, the blocking direction of the further non-return valve 41 points to the side facing away from the further throttle 42. The further sub-duct 40 is thus able to be passed through for the rebound stage of the piston. During the rebound stage, the further non-return valve 41 is in this case however flowed through not by the volume flow which flows through the further valve assembly 61 of the further fluid leadthrough 62 but exclusively by the volume flow which flows through the further throttle 42 and which is throttled by said further throttle 42. This is achieved in that the further non-return valve 41 of the further sub-duct 40 and the further fluid leadthrough 62 with the further valve assembly 61 are connected in parallel with one another. During the compression stage of the piston, the further non-return valve 41 blocks the throughflow through the further sub-duct 40. Furthermore, the throughflow guide of the rebound stage comprises a further valve arrangement with continuously adjustable damping force 18, which comprises a further continuously adjustable control valve 19, wherein the further continuously adjustable control valve 19 is connected in series with the further sub-duct 40 and the further fluid leadthrough 62. It is possible by way of said further continuously adjustable control valve 19 to continuously adjust the damping of the vibration damper for the rebound stage of the piston. According to the exemplary embodiment illustrated in FIG. 1, the throttle 32 (the throttling mechanism 36), the non-return valve 31, the valve arrangement with continuously adjustable damping force 16, the fluid leadthrough 52 and the valve assembly 51 are arranged in a separate housing, which is preferably of cylindrical form, with the further throttle 42 (the further throttling mechanism 46), the further non-return valve 41, the further valve arrangement with continuously adjustable damping force 18, the further fluid leadthrough 62 and the further valve assembly 61 being arranged in a further separate housing, which is preferably of cylindrical form. It is possible that, instead of the continuously adjustable control valve 17 and the further continuously adjustable control valve 19, control valves with fixed, in particular discrete, adjustment stages are used.

Figure 2:
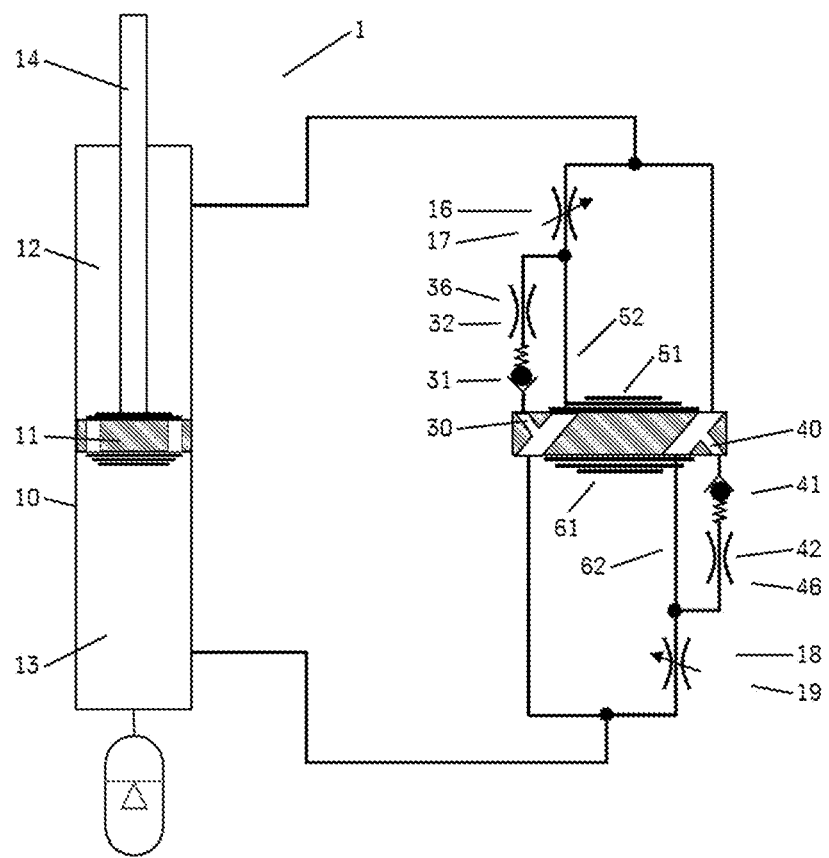
FIG. 2 is a block diagram according to a further exemplary embodiment.

FIG. 2 illustrates a block diagram of the hydraulic flow in a vibration damper 1 according to a further exemplary embodiment of the invention. The piston 11 comprises a piston rod 14 and subdivides the cylinder tube 10 into a first working chamber 12 and a second working chamber 13. The two sub-ducts 30, 40 of the bypass duct 20 are illustrated. Here, the sub-duct 30 comprises a series connection of a non-return valve 31 and a throttle 32, connected in series with said non-return valve 31, as part of a throttling mechanism 36. In this case, the blocking direction of the non-return valve 31 points to the side facing away from the throttle 32. The sub-duct 30 is thus able to be passed through for the compression stage of the piston. During the compression stage, the non-return valve 31 is in this case however flowed through not by the volume flow which flows through the valve assembly 51 of the fluid leadthrough 52 but exclusively by the volume flow which flows through the throttle 32 and which is throttled by said throttle 32. This is achieved in that the non-return valve 31 of the sub-duct 30 and the fluid leadthrough 52 with the valve assembly 51 are connected in parallel with one another. During the rebound stage of the piston, the non-return valve 31 blocks the throughflow through the sub-duct 30. Furthermore, the throughflow guide of the compression stage comprises a valve arrangement with continuously adjustable damping force 16, which comprises a continuously adjustable control valve 17, wherein the continuously adjustable control valve 17 is connected in series with the sub-duct 30 and the fluid leadthrough 52. It is possible by way of said continuously adjustable control valve 17 to continuously adjust the damping of the vibration damper for the compression stage of the piston. Here, the further sub-duct 40 comprises a series connection of a further non-return valve 41 and a further throttle 42, connected in series with said further non-return valve 41, as part of a further throttling mechanism 46. In this case, the blocking direction of the further non-return valve 41 points to the side facing away from the further throttle 42. The further sub-duct 40 is thus able to be passed through for the rebound stage of the piston. During the rebound stage, the further non-return valve 41 is in this case however flowed through not by the volume flow which flows through the further valve assembly 61 of the further fluid leadthrough 62 but exclusively by the volume flow which flows through the further throttle 42 and which is throttled by said further throttle 42. This is achieved in that the further non-return valve 41 of the further sub-duct 40 and the further fluid leadthrough 62 with the further valve assembly 61 are connected in parallel with one another. During the compression stage of the piston, the further non-return valve 41 blocks the throughflow through the further sub-duct 40. Furthermore, the throughflow guide of the rebound stage comprises a further valve arrangement with continuously adjustable damping force 18, which comprises a further continuously adjustable control valve 19, wherein the further continuously adjustable control valve 19 is connected in series with the further sub-duct 40 and the further fluid leadthrough 62. It is possible by way of said further continuously adjustable control valve 19 to continuously adjust the damping of the vibration damper for the rebound stage of the piston. According to the further exemplary embodiment illustrated in FIG. 2, the throttle 32 (the throttling mechanism 36), the non-return valve 31, the valve arrangement with continuously adjustable damping force 16, the fluid leadthrough 52 and the valve assembly 51 and also the further throttle 42 (the further throttling mechanism 46), the further non-return valve 41, the further valve arrangement with continuously adjustable damping force 18, the further fluid leadthrough 62 and the further valve assembly 61 are arranged in a common housing, which is preferably of cylindrical form. It is possible that, instead of the continuously adjustable control valve 17 and the further continuously adjustable control valve 19, control valves with fixed, in particular discrete, adjustment stages are used.

LIST OF REFERENCE SIGNS

1 Hydraulic vibration damper
10 Cylinder tube
11 Piston
12 First working chamber
13 Second working chamber
14 Piston rod
16 Valve arrangement with continuously adjustable damping force
17 Continuously adjustable control valve
18 Further valve arrangement with continuously adjustable damping force
19 Further continuously adjustable control valve
20 Bypass duct
30 Sub-duct
31 Non-return valve
32 Throttle
33 Non-return disk
36 Throttling mechanism
40 Further sub-duct
41 Further non-return valve
42 Further throttle
46 Further throttling mechanism
51 Valve assembly
52 Fluid leadthrough
61 Further valve assembly
62 Further fluid leadthrough

What is claimed is:
1. A hydraulic vibration damper comprising:
a cylinder tube shaped and sized to receive hydraulic fluid,
a piston that is axially movable within the cylinder tube along a cylinder tube axis and subdivides the cylinder tube into two working chambers,
a piston rod that is oriented parallel to the cylinder tube axis and is connected to the piston,
a valve assembly arranged at a fluid leadthrough fluidically between the two working chambers and configured to damp piston movement in a direction of actuation,
a bypass duct that includes a sub-duct disposed fluidically between the two working chambers, and
a valve arrangement configured to generate a continuously adjustable damping force and regulate throughflow through the fluid leadthrough and the sub-duct,
wherein the sub-duct comprises a throttling mechanism, the throttling mechanism having a throttle and a non-return valve arranged in series with respect to one another.
2. The hydraulic vibration damper of claim 1, wherein the non-return valve has a blocking direction that points to the side facing away from the throttle.
3. The hydraulic vibration damper of claim 1, wherein the non-return valve blocks the volume flow through the sub-duct of the bypass duct for one of two possible movement directions of the piston.
4. The hydraulic vibration damper of claim 1, wherein the non-return valve is formed in that, in its open position, it is flowed through only by the volume flow which flows through the sub-duct at which it is arranged.

5. The hydraulic vibration damper of claim 1, wherein the non-return valve of the sub-duct comprises a non-return disk, wherein said non-return disk has an initial pressure lower than 150000 Pa.

6. The hydraulic vibration damper of claim 5, wherein the non-return disk has an initial pressure lower than 100000 Pa.

7. The hydraulic vibration damper of claim 1, wherein the valve arrangement comprises an electromagnetically actuable, continuously adjustable control valve.

8. A hydraulic vibration damper comprising:
a cylinder tube shaped and sized to receive hydraulic fluid,
a piston that is axially movable within the cylinder tube along a cylinder tube axis and subdivides the cylinder tube into two working chambers,
a piston rod that is oriented parallel to the cylinder tube axis and is connected to the piston,
a valve assembly arranged at a fluid leadthrough fluidically between the two working chambers and configured to damp piston movement in a direction of actuation,
a bypass duct that includes a sub-duct disposed fluidically between the two working chambers, and
a valve arrangement configured to generate a continuously adjustable damping force and regulate throughflow through the fluid leadthrough and the sub-duct,
wherein the sub-duct comprises a throttling mechanism, the throttling mechanism having a throttle and a non-return valve arranged in series with respect to one another,
wherein the vibration damper comprises a further valve assembly configured to damp piston movement in a second direction of actuation, which further valve assembly is arranged at a further fluid leadthrough.

9. The hydraulic vibration damper of claim 8, wherein the bypass duct comprises a further sub-duct, wherein a further valve arrangement with continuously adjustable damping force is provided which regulates the throughflow through the further fluid leadthrough and the further sub-duct.

10. The hydraulic vibration damper of claim 9, wherein the further sub-duct comprises a further non-return valve and one further throttling mechanism, which comprises a further throttle, wherein the further throttle and the further non-return valve are arranged in series with respect to one another, wherein the further non-return valve is formed in that, in its open position, it is flowed through only by the volume flow which flows through the further sub-duct at which it is arranged.

11. The hydraulic vibration damper of claim 10, wherein the non-return valves and identical throttling mechanisms of the sub-duct of the bypass duct and the further sub-duct of the bypass duct are identical.

12. The hydraulic vibration damper of claim 9, wherein the sub-duct is able to be passed through only during the compression stage, and the further sub-duct is able to be passed through only during the rebound stage, of the piston.

13. The hydraulic vibration damper of claim 9, wherein the further valve arrangement comprises a further electromagnetically actuable, continuously adjustable control valve.

14. The hydraulic vibration damper of claim 9, wherein the bypass duct, including the components of the two sub-ducts, is arranged in a common housing with a first and a second hydraulic chamber, wherein the first hydraulic chamber connects the bypass duct to the first working chamber of the cylinder tube via a first bore, and the second hydraulic chamber connects the bypass duct to the second working chamber of the cylinder tube via a second bore.

15. The hydraulic vibration chamber as claimed in claim 14, wherein the housing is of cylindrical form.

* * * * *